(12) United States Patent
Decoux (10) Patent No.: US 10,599,901 B2
(45) Date of Patent: Mar. 24, 2020

(54) METHOD, IMAGING DEVICE AND SYSTEM FOR GENERATING A MEASURE OF AUTHENTICITY OF AN OBJECT

(71) Applicant: SICPA HOLDING SA, Prilly (CH)

(72) Inventor: Eric Decoux, Vevey (CH)

(73) Assignee: SICPA HOLDING SA, Prilly (CH)

( * ) Notice: Subject to any disclaimer, the term of this patent is extended or adjusted under 35 U.S.C. 154(b) by 0 days.

(21) Appl. No.: 16/308,769

(22) PCT Filed: May 16, 2017

(86) PCT No.: PCT/EP2017/061684
§ 371 (c)(1),
(2) Date: Dec. 10, 2018

(87) PCT Pub. No.: WO2017/211548
PCT Pub. Date: Dec. 14, 2017

(65) Prior Publication Data
US 2019/0311168 A1 Oct. 10, 2019

(30) Foreign Application Priority Data
Jun. 10, 2016 (EP) .................................. 16173961

(51) Int. Cl.
*G06K 7/14* (2006.01)
*G06K 7/10* (2006.01)
*G06K 9/00* (2006.01)

(52) U.S. Cl.
CPC ....... *G06K 7/1417* (2013.01); *G06K 7/10881* (2013.01); *G06K 9/00577* (2013.01);
(Continued)

(58) Field of Classification Search
CPC . G02B 26/10; G06K 9/22; G06K 7/14; G07G 1/0081
(Continued)

(56) References Cited

U.S. PATENT DOCUMENTS 6,203,069 B1  3/2001 Outwater et al.
2006/0022059 A1  2/2006 Juds
(Continued)

FOREIGN PATENT DOCUMENTS

GB  2527508  12/2015
JP  2008203738  9/2008

OTHER PUBLICATIONS

Miao Wang et al.: "Nanomaterial-based barcode", Nanoscale, vol. 7, May 25, 2015, pp. 11240-11247.
(Continued)

*Primary Examiner* — Edwyn Labaze
(74) *Attorney, Agent, or Firm* — Muncy, Geissler, Olds & Lowe, P.C.

(57) ABSTRACT

The invention notably relates to generating a measure of authenticity of an object (20) comprising a surface (30) comprising or covered by a non-uniform preexisting layer (40). A marking (50) has been printed on the surface (30) so that a property of the preexisting layer (40) is detectable through at least part of the marking (50). The marking (50) comprises a machine-readable representation of a code. The method comprises imaging (s100) the marking (50); reading (s200) the code represented by the imaged marking; generating (s300) a signature based on the property of the preexisting layer (40) as detected by the imaging device (10) through at least part of the imaged machine-readable representation of the code; and generating of a measure of authenticity of the object (20) based on the read code and generated signature. The invention also relates to apparatuses, systems and computer programs for that purpose.

8 Claims, 8 Drawing Sheets

(52) U.S. Cl.
CPC .............. *G06K 2007/10524* (2013.01); *G06K 2009/0059* (2013.01)

(58) Field of Classification Search
USPC ................ 235/472.01, 375, 454, 462.15
See application file for complete search history.

(56) References Cited

U.S. PATENT DOCUMENTS

| | | |
|---|---|---|
| 2007/0192850 A1 | 8/2007 | Cowburn |
| 2009/0283583 A1 | 11/2009 | Cowburn et al. |
| 2010/0253063 A1* | 10/2010 | Skogster ............... A63F 3/0665 283/100 |
| 2013/0002713 A1 | 1/2013 | Souparis et al. |
| 2016/0267369 A1* | 9/2016 | Picard .................. G06K 7/1417 |
| 2017/0213064 A1* | 7/2017 | Ackley ................ G06K 7/1473 |
| 2019/0126660 A1* | 5/2019 | Dorier ................. C09D 11/033 |

OTHER PUBLICATIONS

Mantoro Teddy et al.: "Real-Time Printed Document Authentication Using Watermarked QR Code", 2015 Fourth International Conference on Cyber Security, Cyber Warfare and Digital Forensic (Cybersec), IEEE, Oct. 29, 2015, pp. 68-72.

Harsha Umesh Babu et al.: "Anti-counterfeiting using reflective micro structures—based on random positioning of microstructures", Advances in optoelectrics and micro/nano-optics (AOM), 2010, OSA-IEEE-COS, IEEE, 5 pages.

ISO/IEC 15415: 2004, "Information technology—Automatic identification and data capture techniques—Bar code print quality test specifications—Two-dimensional symbols", ISO/IEC, 2004, Switzerland p. 17, section 7.8.4), 58 pages.

International Search Report and Written Opinion issued with respect to application No. PCT/EP2017/061684.

International Preliminary Report on Patentability issued with respect to application No. PCT/EP2017/061684.

* cited by examiner

METHOD, IMAGING DEVICE AND SYSTEM FOR GENERATING A MEASURE OF AUTHENTICITY OF AN OBJECT

TECHNICAL FIELD

The present invention notably relates to methods for generating, or at least contributing in generating, a measure of authenticity of an object. The invention also relates to devices, systems, computer programs, computer program products, and storage mediums for the same purposes.

BACKGROUND

The supply of counterfeit goods in a particular market causes a loss of revenue to manufacturers of the corresponding genuine goods, as well as to governments when those goods are subject to taxation. End users are adversely affected by counterfeit goods because they are supplied with products of inferior quality, which may even be dangerous to the health of the end user for certain products, such as when medicines are the subject of counterfeiting. The manufacturer of high-quality genuine products will consequently suffer a loss to its goodwill.

A number of anti-counterfeiting measures have been proposed in the prior art with respect, for example, to alcoholic and non-alcoholic drinks (beer, wine, liquor, softdrinks, etc.), tobacco products (cigarettes, cigars, loose tobacco, etc.), medicinal products, perfumes and excisable products generally. It is known to make use of sophisticated printing techniques to make the design on the package as hard to replicate as possible.

It is also known to make use of fluorescing or phosphorescing items that look one way under ambient light and look a different way under ultraviolet (UV) or infrared (IR) radiation. Also used are holographic images of varying degrees of complexity. Other known techniques include watermark technology, engraved gravure lines and marks that change colour depending on heat applied to the mark.

GB 2527508 A relates to an anti-counterfeiting identification label comprising a window, a transparent adhesive layer and randomly dispersed absorptive and reflective particles contained in the transparent adhesive layer. An identification pattern is created based on the combination of the pattern defined by the particles and the surface features of the object to which the label is applied. This pattern is registered in a database and may be accessed to provide authentication of the object.

In the light of the above, there is a need for providing faster, simpler, less expensive, and more reliable and robust methods for the purpose of authenticating objects.

SUMMARY

To meet or at least partially meet the above-mentioned goals, methods, imaging devices, systems, computer programs, computer program products, and storage mediums according to the invention are defined in the independent claims. Particular embodiments are defined in the dependent claims.

In one embodiment, a method is carried out by an imaging device for the purpose of generating a measure of authenticity of an object or at least for the purpose of contributing in generating a measure of authenticity of the object. The object comprises a surface at least partially comprising, or covered by, a layer, hereinafter referred to as "preexisting layer". The preexisting layer has at least one of a reflectance, reflectance spectrum, reflection, and emission property that is non-uniform. A marking has been printed on a region of the surface in such a manner that the property of the preexisting layer is detectable by the imaging device through at least part of the marking. Furthermore, the marking comprises a machine-readable representation of a code. The method comprises the following steps: First, the marking is imaged. Then, the code represented by the imaged marking is read. A signature is also generated based on the property of the preexisting layer as detected by the imaging device through at least part of the imaged machine-readable representation of the code. At least one of the following steps is then carried out: (a) the read code and generated signature are transmitted to a processing device for enabling the generation of a measure of authenticity of the object, and (b) a measure of authenticity of the object is generated based at least on the read code and generated signature.

Such a method enables the efficient verification of whether, or the extent to which, the generated signature of the preexisting layer is as expected in accordance with an association between the code and a preexisting layer signature obtained beforehand (e.g., immediately or shortly after printing the marking on the object's surface). If so, the object is likely to be authentic. Otherwise, the object is more likely to be a counterfeit.

The invention also relates, in one embodiment, to an imaging device for carrying out the above-mentioned method for generating a measure of authenticity of an object or for contributing in generating a measure of authenticity of the object. As mentioned above, the object comprises a surface at least partially comprising, or covered by, a layer (the so-called "preexisting layer"); the preexisting layer has at least one of a reflectance, reflectance spectrum, reflection, and emission property that is non-uniform; a marking has been printed on a region of the surface in such a manner that the property of the preexisting layer is detectable by the imaging device through at least part of the marking; and the marking comprises a machine-readable representation of a code. The imaging device is configured for: imaging the marking; reading the code represented by the imaged marking; generating a signature based on the property of the preexisting layer as detected by the imaging device through at least part of the imaged machine-readable representation of the code; and at least one of: (a) transmitting, to a processing device, the read code and generated signature for enabling the generation of a measure of authenticity of the object, and (b) generating a measure of authenticity of the object based at least on the read code and generated signature.

The invention further relates, in one embodiment, to a method for creating reference data to enable the later generation (such as for example using the above-described method carried out by an imaging device) of a measure of authenticity of an object. As explained above, the object comprises a surface at least partially comprising, or covered, by a layer (the so-called "preexisting layer"), and the preexisting layer has at least one of a reflectance, reflectance spectrum, reflection, and emission property that is non-uniform. A marking has been printed on a region of the surface in such a manner that the property of the preexisting layer is detectable by an imaging device through at least part of the marking. The marking comprises a machine-readable representation of a code. The method comprises the following steps. The imaging device images the marking. A signature is generated based on the property of the preexisting layer as detected by the imaging device through at least part of the imaged machine-readable representation of the code. Then, the code is stored in association with the generated signature as reference data in a data storage unit.

The invention also relates, in one embodiment, to a system for carrying out the above-mentioned method of creating reference data to enable later generation of a measure of authenticity of an object. The system comprises an imaging device. As mentioned above, the object comprises a surface at least partially comprising, or covered by, a layer (the so-called "preexisting layer"); the preexisting layer has at least one of a reflectance, reflectance spectrum, reflection, and emission property that is non-uniform; a marking has been printed on a region of the surface in such a manner that the property of the preexisting layer is detectable by the imaging device through at least part of the marking; and the marking comprises a machine-readable representation of a code. The system is configured for: imaging, by the imaging device, the marking; generating a signature based on the property of the preexisting layer as detected by the imaging device through at least part of the imaged machine-readable representation of the code; and storing the code in association with the generated signature as reference data in a data storage unit.

The invention also relates, in some embodiments, to a computer program or a set of computer programs for carrying out an imaging method as described above, to a computer program product or a set of computer program products for storing a computer program or a set of computer programs as described above, and to a storage medium for storing a computer program or a set of computer programs as described above.

BRIEF DESCRIPTION OF THE DRAWINGS

Embodiments of the present invention shall now be described, in conjunction with the appended figures, in which.

DETAILED DESCRIPTION

The present invention shall now be described in conjunction with specific embodiments. These specific embodiments serve to provide the skilled person with a better understanding, but are not intended to restrict the scope of the invention, which is defined by the appended claims.

Figure 1:
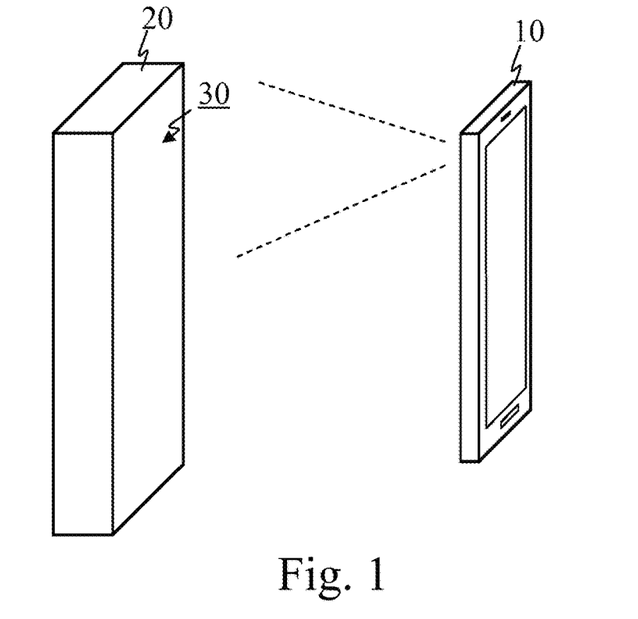
FIG. 1 schematically illustrates an imaging device and an object to be authenticated, in one embodiment of the invention.

FIG. 1 schematically illustrates an imaging device 10 and an object 20 to be authenticated in one embodiment of the invention. Object 20 may for example be, without being limited to, a bottle or can of beer, wine, liquor or soft-drink, a packet of cigarettes or cigars, a medicine pack, a bottle of perfume, or any other excisable goods, some kind of fast-moving consumer good (FMCG), a banknote, a value paper, an identity document, a card, ticket, label, security foil, security thread or the like. Object 20 comprises a surface 30 having (i.e., comprising or covered with) a pre-existing layer 40 on which a marking 50 has been printed, as will be explained in more detail with reference to FIG. 2.

Imaging device 10 has a camera (not shown) capable of imaging object 20, and in particular surface 30 thereof, or at least a portion of surface 30. In one embodiment, imaging device 10 is a hand-held device, such as for example at least one of: a mobile phone, a smartphone, a feature phone, a tablet computer, a phablet, a portable media player, a netbook, a gaming device, a personal digital assistant, and a portable computer device.

Electromagnetic radiation coming from surface 30 of object 20 and reaching the camera of imaging device 10 may originate in part or in full from the reflection of electromagnetic radiation emitted by an electromagnetic radiation source (not shown). Electromagnetic radiation from surface 30 of object 20 and reaching the camera of imaging device 10 may alternatively, or additionally, originate in part or in full from some form of photoluminescence (i.e., fluorescence or phosphorescence) of a substance of surface 30 of object 20 upon or after the illumination of surface 30 of object 20 by electromagnetic radiation emitted by an electromagnetic radiation source. In both cases (i.e., radiation by reflection, reflectance, or by some form of photoluminescence), the electromagnetic radiation source may, in one embodiment, be integrated with, or attached to, imaging device 10 (or part thereof). Said electromagnetic radiation source may for example be a light source, an infrared radiating source, and/or an UV radiating source.

Figure 2:
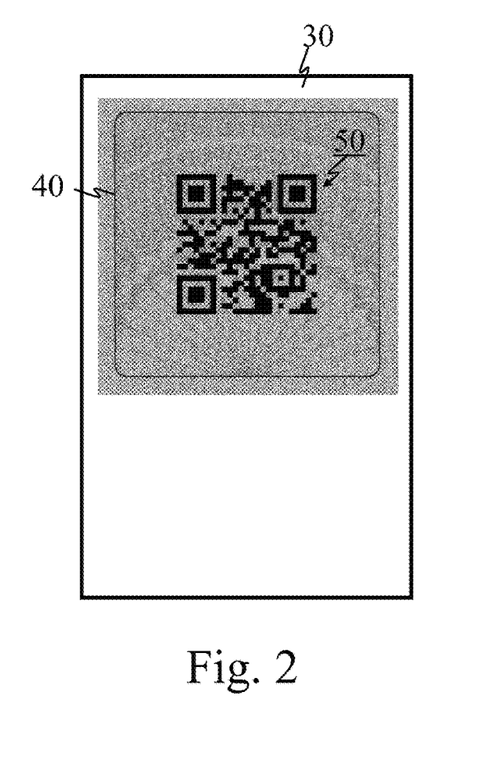
FIG. 2 schematically illustrates a surface of an object in one embodiment of the invention.

FIG. 2 schematically illustrates an exemplary surface 30 of object 20 illustrated by FIG. 1, in one embodiment of the invention. Surface 30 is partially covered by a layer 40, the so-called "pre-existing layer". In one embodiment (not shown), surface 30 is entirely covered by pre-existing layer 40. Alternatively, surface 30 may actually comprise pre-existing layer 40, which extends in at least a region of surface 30. In one embodiment (not shown), surface 30 comprises a pre-existing layer 40 extending in the entire surface 30. Pre-existing layer 40 has at least one of a reflectance, reflectance spectrum (also called "spectral reflectance curve", i.e. the reflectance as a function of wavelength), reflection, and emission property that is non-uniform. In other words, said property has a spatial variability over the surface covered by pre-existing layer 40 or in which pre-existing layer 40 extends. For example, pre-existing layer 40 may have a particular pattern, such a guilloche pattern as shown on FIG. 2, or a mark, logo, or image printed directly on object 20, or, alternatively, a mark, logo, or image printed on a label apposed on object 20, such as for example on a cap or capsule of object 20. The pattern may for example be in colour or in shades of grey. In one embodiment, the pattern or the like is printed on pre-existing layer 40 using any one of the following printing techniques: heliogravure, offset, and flexography.

A marking 50 has been printed on a region of surface 30 covered by, or comprising, pre-existing layer 40. Marking 50 comprises a machine-readable representation of a code. In one embodiment, the machine-readable representation of the code comprises a linear barcode and/or a two-dimensional barcode, such as for example a DataMatrix, a QR code, etc. In one embodiment, marking 50 comprises a machine-readable representation of a code, such as for example a QR code, which is printed using any one of the following printing techniques: thermal transfer overprint, drop-on-demand (DoD) thermal inkjet, DoD piezo inkjet, and laser marking.

Marking 50 is printed on surface 30 in such a manner that the above-referred non-uniform property of pre-existing layer 40 is detectable by imaging device 10 through at least part of marking 50. By "through at least part of marking 50", it is herewith meant: a) in spatial gaps within the marking (such as for example in the transparent modules of a QR code) and/or b) through the dark parts of printed marking considering the possible impact of pre-existing layer 40 even if pre-existing layer 40 is partially hidden by the marking (such as for example in the sense that the darkness of the black modules of a QR code may vary depending on the property of pre-existing layer 40 at the position of the black module under consideration). The effect discussed in point b) is known in the field of symbology as modulation (in that respect, see for example: ISO/IEC 15415:2004, "Information technology—Automatic identification and data capture techniques—Bar code print quality test specification—Two-dimensional symbols", ISO/IEC, 2004, Switzerland, page 17, section 7.8.4). In order to be detectable by imaging device 10, the non-uniform property of pre-existing layer 40 should typically be a property distinguishable from the noise involved in the imaging process.

The pattern on pre-existing layer 40 may be a visible or invisible pattern, for example printed with a visible or invisible printing ink. Relative to marking 50, pre-existing layer 40 may be regarded as a form of substrate. Printed marking 50 may as well be a visible or invisible marking, for example printed with a visible or invisible printing ink.

In one embodiment, marking 50 is printed above pre-existing layer 40. In such case, pre-existing layer 40 is an underlying layer and printed marking 50 forms an overlying layer (as shown in FIG. 2). If the marking is for example a QR code, the overlying layer may be incomplete in the sense that ink may be used for dark modules but not for light modules.

In another embodiment, marking 50 is printed by locally removing a portion of a substrate and therefore revealing the layer under the substrate (through some kind of engraving, etching, or the like), said layer being pre-existing layer 40.

In yet another embodiment, marking 50 is printed by transforming the properties of a substrate (e.g., locally burning, deforming, or the like), said substrate being pre-existing layer 40.

Figure 3A:
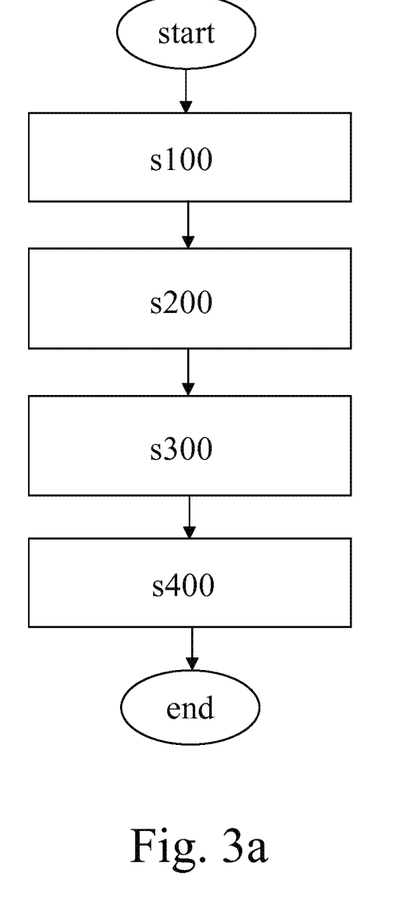
FIG. 3*a* is a flowchart of a method in one embodiment of the invention, wherein the method contributes in generating a measure of authenticity of an object.

FIG. 3a is a flowchart of a method in one embodiment of the invention, wherein the method contributes in generating a measure of authenticity of object 20 (as discussed with reference to FIGS. 1 and 2).

In step s100, marking 50 is imaged.

Then, in step s200, the code represented by the imaged marking is read, i.e. decoded.

In step s300, a signature is generated based on the non-uniform property (as discussed above) of preexisting layer 40 as detected by imaging device 10 through at least part of the imaged machine-readable representation of the code. The detected property may therefore for example be at least one of: the luminance of the imaged points, and the colour components (e.g., RGB components) of the imaged points. Step s300 need, however, not necessarily be carried out after step s200. Step s300 may alternatively be carried out prior to step s200, or both steps s200 and s300 may be carried out in parallel. The signature may for example comprise a sequence or array of bits or bytes derived from the property of preexisting layer 40 as detected by imaging device 10 through the imaged machine-readable representation of the code. The signature may also be regarded as a fingerprint of preexisting layer 40 as detected by imaging device 10 through at least part of the imaged machine-readable representation of the code.

In step s400, imaging device 10 then transmits to a processing device (not shown on FIG. 1) the read code and generated signature for enabling the generation of a measure of authenticity of object 20 (as will be explained in more detail with reference to FIG. 5). The read code and generated signature may be transmitted on any suitable wired or wireless channel using any transmission format (such as for example using Internet Protocol (IP) packets).

The method thus enables the verification, by the processing device (as will be explained in more detail with reference to FIG. 5), of whether, or the extent to which, the generated signature of the preexisting layer is as expected in accordance with an association between the read code and a preexisting layer signature obtained beforehand (e.g., immediately or shortly after printing the marking 50 on the object's 20 surface 30). If so, object 20 is likely to be authentic. Otherwise, it is more likely to be a counterfeit.

Furthermore, the method provides a robust authentication method thanks to the high degree of uniqueness of the preexisting layer's 40 property detected through the imaged markings, at least for the two following reasons:

First, since marking 50 represents a machine-readable code (such as for example a QR code), the (internal) shape of marking 50 depends on the code, and the portion of preexisting layer 40 that is visible through marking 50 also depends on the code. This means that, when a different code is printed on each of a large number of objects, different portions of preexisting layer 40 are visible through the spatial gaps within marking 50. In other words, the masks created over preexisting layer 40 by the obscuring regions of each of the markings 50 reveal a large variability of regions of preexisting layer 40. By a large number of objects, it is meant here for example one hundred objects or more, or one thousand objects or more, with all objects typically having a preexisting layer 40 bearing the same pattern, although different patterns may optionally also be used for different sets of objects.

Secondly, the portion of preexisting layer 40 that is visible through marking 50 also depends on the precise position (i.e., location and rotational orientation) where marking 50 is printed. Thus, when markings 50 are printed on each of a large number of objects in a production or distribution line typically operating at a high speed, different portions of preexisting layer 40 are visible through the respective markings 50 (i.e., through the spatial gaps within the respective markings 50). This follows from the tolerances of the printing process when it comes to positioning in a production or distribution line typically operating at a high speed. This therefore increases the above-mentioned variability in the revealed regions of preexisting layer 40 among the objects.

Figure 3B:
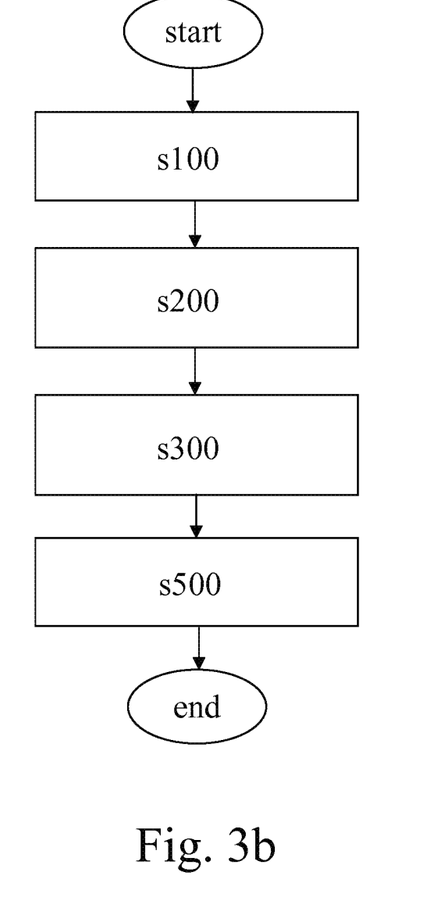
FIG. 3*b* is a flowchart of a method in one embodiment of the invention, wherein the method generates a measure of authenticity of an object.

FIG. 3b is a flowchart of a method in one embodiment of the invention, which differs from the embodiment described with reference to FIG. 3a in that, rather than transmitting both the read code and generated signature to a processing device (to allow the processing device to generate the measure of authenticity), imaging device 10 itself generates, in step s500, a measure of authenticity of object 20 based at least on the read code and generated signature. In such an embodiment, imaging device 10 may therefore be regarded as an audit device, such as for example a hand-held audit device, capable of generating a measure of authenticity of an object, and providing the authenticity measure to, for example, the device's operator.

Figure 4A:
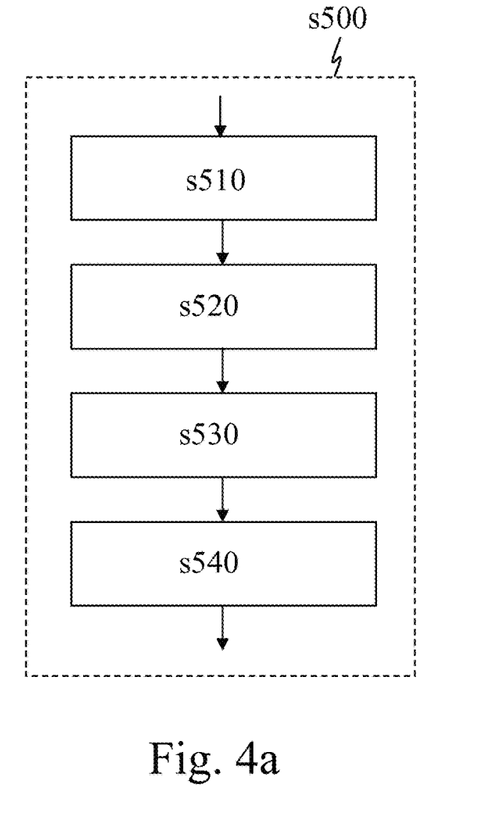
FIGS. 4*a* and 4*b* are two flowcharts of step s500 of the method illustrated in FIG. 3*b*, in accordance with two sub-embodiments of the invention.

Step s500 of FIG. 3b may for example be implemented as follows:

In a first sub-embodiment, illustrated by the flowchart of FIG. 4a, step s500 comprises the following sub-steps: (i) transmitting s510 the code read in step s200 from imaging device 10 to a processing device (such as for example a computer or set of computers acting as a server for imaging device 10); (ii) checking s520, by the processing device, the code against the records of a data storage unit or database to retrieve (i.e. fetch) a signature associated with the code in the data storage unit or database; (iii) transmitting s530 the signature retrieved in sub-step s520 from the processing device to imaging device 10, and (iv) generating s540, by imaging device 10, a measure of authenticity of object 20 based at least on the result of the comparison between the signature generated in step s300 and the signature received in sub-step s530.

Figure 4B:
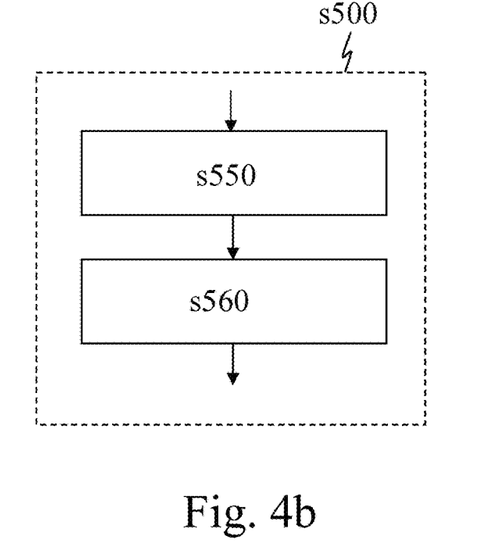

In a second sub-embodiment, illustrated by the flowchart of FIG. 4b, step s500 comprises the following sub-steps: (i) checking s550, by imaging device 10, the code against the records of a data storage unit or database to retrieve a signature associated with the code in the data storage unit or database, wherein the data storage unit or database is stored on imaging device 10 itself; (ii) generating s560, by imaging device 10, a measure of authenticity of object 20 based at least on the result of the comparison between the signature generated in step s300 and the signature retrieved in sub-step s550.

Compared to the methods described with reference to FIG. 4b in conjunction with FIG. 3b, the methods described with reference to FIG. 3a and those described with reference to FIG. 4a in conjunction with FIG. 3b are advantageous in that it is typically not necessary to store on imaging device 10 any associations between pairs of codes and signatures against which the authentication verification is to be performed.

Figure 5:
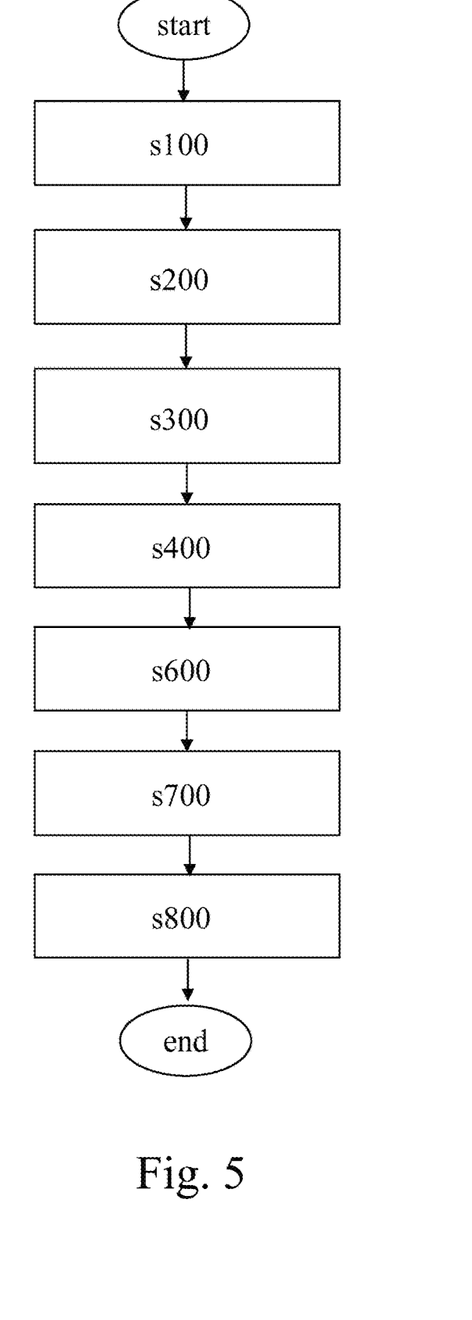
FIG. 5 is a flowchart of a method in one embodiment of the invention, wherein the method is carried out by both an imaging device and a processing device and the method results in generating a measure of authenticity of an object.

FIG. 5 is a flowchart of a method in one embodiment of the invention, which is carried out by both imaging device 10 and a processing device after transmitting s400, by imaging device 10 to the processing device, the read code and generated signature. The processing device retrieves s600, in a data storage unit, a signature stored in association with the read code. The processing device compares s700 the generated signature with the stored signature, and then generates s800 a measure of authenticity of object 20 based at least on the result of the comparison between the generated signature and the stored signature.

In one embodiment, after generating the measure of authenticity, the processing device transmits said measure of authenticity back to imaging device 10 (this step is not shown on FIG. 5), where information regarding the authenticity of object 20 may be outputted in one way or another to the imaging device's 10 operator (who may for example be an end user), for example on a display or through any other type of user interface. In such an embodiment, imaging device 10 may therefore be regarded as an audit device, such as for example a hand-held audit device, configured for providing a measure of authenticity of an object to, for example, the device's operator.

In another embodiment, after generating the measure of authenticity, the processing device does not transmit said measure of authenticity back to imaging device 10. In such an embodiment, the operator of imaging device 10 (who may for example be an end user) may therefore not be aware that imaging marking 50 has led to more than merely reading the code represented by the imaging marking. In other words, the operator of imaging device 10 may be unaware that carrying out the method eventually contributes to authenticating object 20.

In one embodiment, the machine-readable representation of the code comprises a two-dimensional barcode, and in step s300 (referred to in FIGS. 3a, 3b and 5), the signature is generated based on the imaged marking within the boundaries of the two-dimensional barcode, such as for example based on the imaged marking exclusively within the boundaries of the two-dimensional barcode.

In one embodiment, generating s300 the signature comprises estimating spatial changes in the property of preexisting layer 40 as detected by imaging device 10 through at least part of the imaged machine-readable representation of the code. An example of such an embodiment is described later with reference to FIGS. 9 and 10. In particular, in one embodiment, the signature may be generated s300 by averaging the pixels in each light module of a QR code, computing local differences between the average values for each of the neighbouring light modules, and carrying the comparison based thereon.

In one embodiment, generating a measure of authenticity of object 20 comprises authenticating it, i.e. determining that it is likely to be authentic or not. In one embodiment, generating a measure of authenticity of object 20 comprises generating an authenticity measure such as for example a real value between 0 and 1, wherein '0' may mean "fully sure that the object is not authentic" and '1' may mean "fully sure that the object is authentic". If object 20 is, for example, a container or package containing some goods, the generated measure of authenticity may merely amount to a measure of authenticity of the goods determined through a mark or sign existing on the container or package (assuming that the container or package has not been tampered with), not necessarily directly enabling to authenticate the goods as such.

In one embodiment, marking 50 is a QR code as illustrated for example by FIG. 2. The QR code, i.e. marking 50, comprises square dots arranged in a square grid on a background (corresponding to pre-existing layer 40). The square dots are called "dark modules" or "black modules" and the remaining dots are called "light modules" or "transparent modules". In order to measure a discriminative image texture property, pre-existing layer 40 should include a sufficient level of variation of visible or invisible features, such as colours or edges. The image texture property, i.e. the non-uniform property of pre-existing layer 40, may form a by-product of the graphic design (e.g. logo) applied to a substrate (e.g. a product package or a label). The texture (i.e., the non-uniform property of pre-existing layer 40) may also be intentionally added to the substrate as a security measure to authenticate the product item (i.e., object 20). Further, the image texture (i.e., the non-uniform property of pre-existing layer 40) may be inherently part of the substrate. In that respect, see for example US 2007/0192850 A1, relating to analysing the acquired image of the microstructure of the paper to estimate a fingerprint for product authentication.

In this embodiment, the QR code acts as a mask to localize the parts of regions (i.e. the transparent modules) where the image texture (i.e., the non-uniform property of pre-existing layer 40) is measured. The benefit of this masking process is the difficulty to replicate the security pattern. For example, in high-speed production lines, the product items (i.e., objects 20) are conveyed so fast that it is not feasible, or at least extremely difficult, for a counterfeiter to apply the QR code in the same position on the product item. This variability strengthens the randomness of the masked image texture (i.e., the non-uniform property of pre-existing layer 40) and consequently the randomness of the signature as well.

Figure 6:
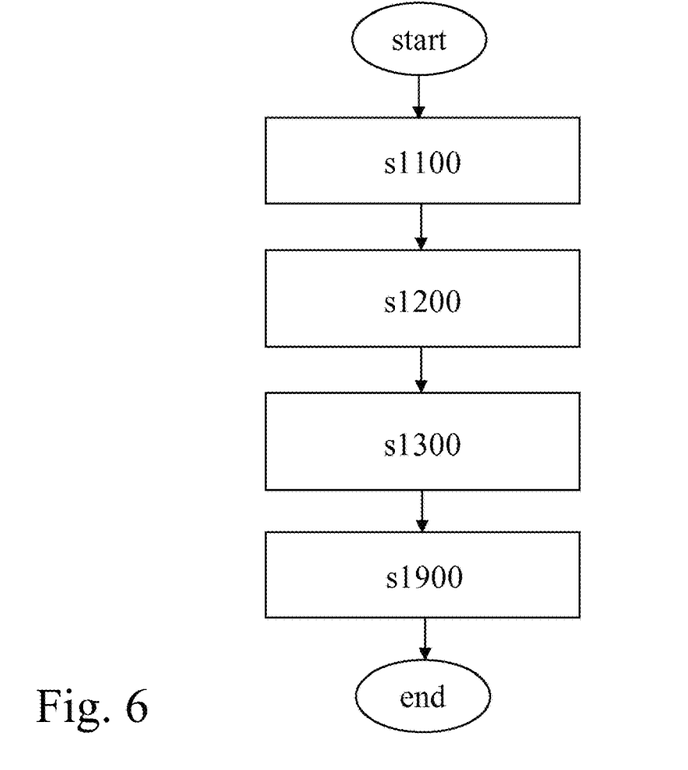
FIG. 6 is a flowchart of a method in one embodiment of the invention, wherein the method results in creating reference data to enable later generation of a measure of authenticity of an object.

FIG. 6 is a flowchart of a method in one embodiment of the invention, wherein the method results in creating reference data to enable the later generation, as discussed above, of a measure of authenticity of an object 20. As also described above, object 20 comprises a surface 30 at least partially comprising, or covered by, a layer 40 (the so-called "preexisting layer"); the preexisting layer 40 has at least one of a reflectance, reflectance spectrum, reflection, and emission property that is non-uniform; marking 50 has been printed on a region of surface 30 in such a manner that the property of preexisting layer 40 is detectable by an imaging device (which need not be the same type of device as imaging device 10 mentioned above) through at least part of marking 50; and marking 50 comprises a machine-readable representation of a code.

The method comprises the following steps. An imaging device images s1100 printed marking 50, which means, in one embodiment, imaging marking 50 and imaging nothing (or almost nothing) around marking 50. The code represented by imaged marking 50 is then optionally read s1200. Alternatively (or additionally), the code may be known from the printing operation. A signature is generated s1300 based on the property of the pre-existing layer 40 as detected by the above-mentioned imaging device through at least part of the imaged machine-readable representation of the code. The code is then stored s1900 in association with the generated signature as reference data in a data storage unit. The process may be repeated for a large number of objects, and may thus lead to populating the data storage unit with reference data. Said reference data can later be used for authentication purposes.

Figure 7:
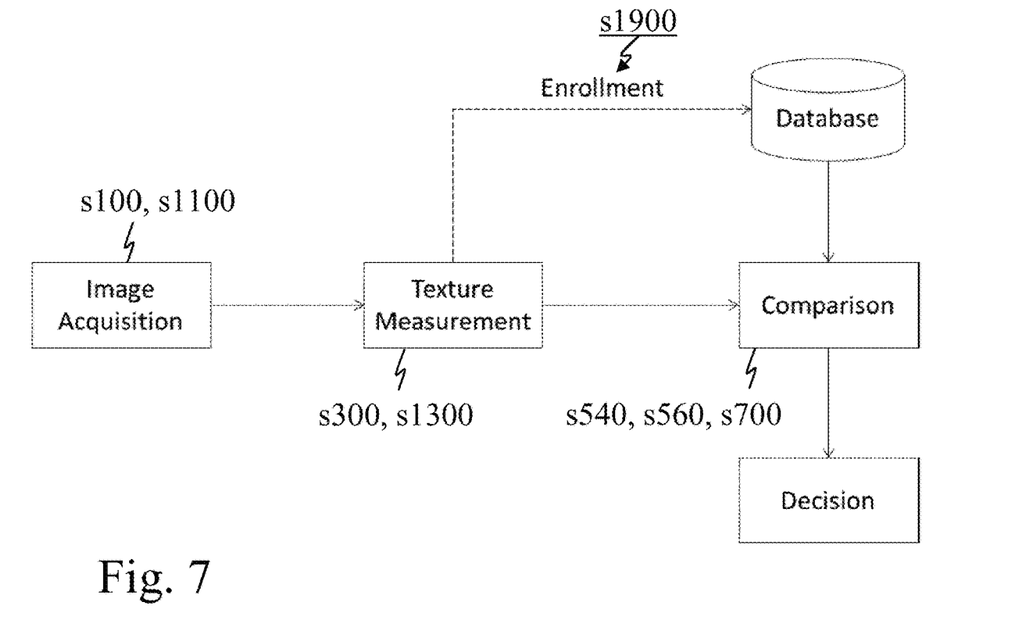
FIG. 7 is an overview block diagram of an authentication system in one embodiment of the invention.

FIG. 7 shows an overview block diagram of an authentication system, in one embodiment of the invention. The first step s100, s1100 comprises acquiring an image of a marking 50, such as a QR code. This task may be carried out for example on a production or distribution line within a quality control process to ensure the decodability of the QR code. The acquired image serves as an input for a texture measurement module for generating s300, s1300 a signature as discussed above. This processing s300, s1300 may for example be applied to the region parts of the image which corresponds to the light modules of the QR code. For example, local histograms of four edge directions in the transparent modules are computed. One way to measure the texture (i.e., the property of pre-existing layer 40), in order to generate s300, s1300 the signature, is discussed later with reference to FIGS. 8 to 10.

If the image of the QR code is acquired s1100 for the first time, the measured image texture (i.e., the detected property of pre-existing layer 40, as a signature) or information derived therefrom (i.e., the signature) is associated s1900 with an identifier of the product item encoded in the QR code and stored s1900 in a database as reference data for subsequent authentication. The recording s1900 of the association between, on the one hand, the identifier of the product item (i.e., the code represented by marking 50 on object 20) and, on the other hand, the measured image texture (i.e., the detected property of pre-existing layer 40, as a signature) or information derived therefrom (i.e., the signature) in the database is known as the enrolment.

If a product item 20 is to be authenticated, an image of the QR code is acquired s100 and the image texture (i.e., the property of pre-existing layer 40) in the transparent modules is measured s300. The identifier of the product item, i.e. the code, is extracted s200 from the decoded QR code. This information allows a fast retrieval of the corresponding reference signature from the database. At the comparison step s540, s560, s700, the reference signature is compared with the generated signature to generate the measure of authenticity.

At the decision step, a thresholding method is applied to the comparison distance to make a decision (i.e. a binary value) as to whether the product item 20 is genuine or not. The threshold may be the result of a training process.

Figure 8:
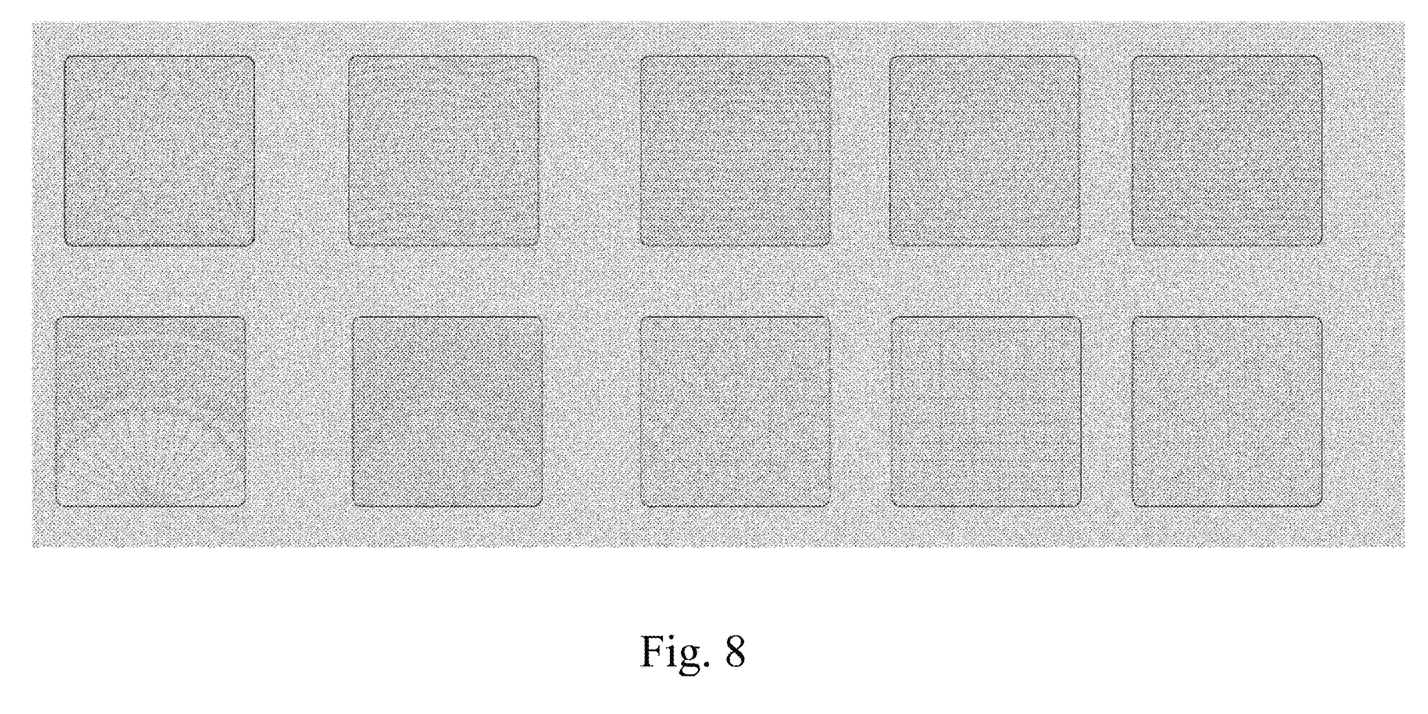
FIG. 8 shows exemplary patterns that may be used on the pre-existing layer in embodiments of the invention.
Figure 9:
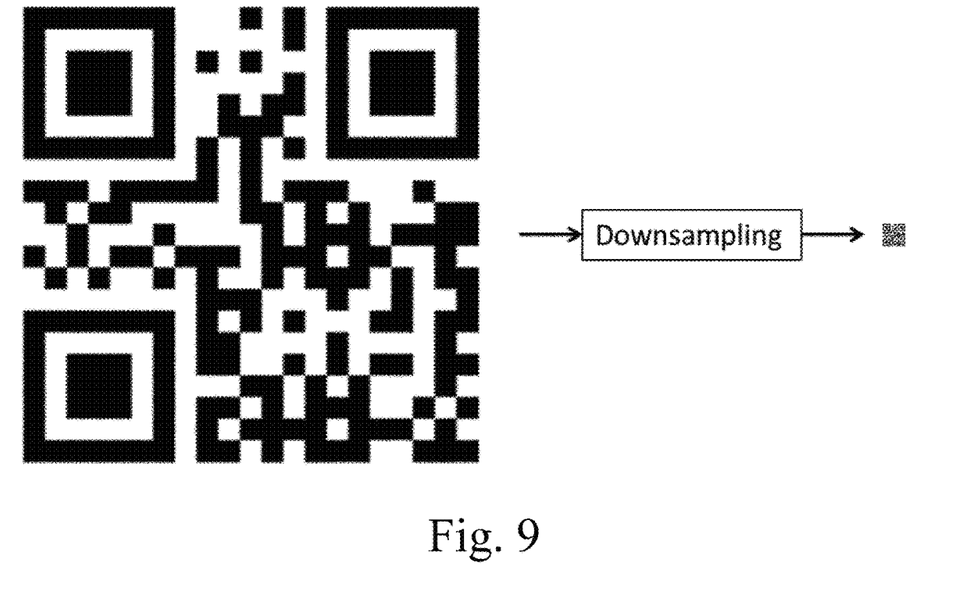
FIG. 9 schematically illustrates the downsampling of a QR code of 21×21 modules corresponds to an image of 21×21 pixels, in one embodiment of the invention.

In one embodiment, a QR code storing a unique identifier (i.e., code) is printed on a textured substrate, i.e. pre-existing layer 40 (see examples of textures in FIG. 8). In order to measure the image texture, i.e. in order to measure the non-uniform property of pre-existing layer 40, and generate s300 the signature, the following steps A to F are performed in that embodiment:

Step A: For each dark and transparent (light) module of the QR code in the acquired image, the average of the pixel intensities is computed. The goal of the averaging operation is to reduce both the size of the image (to allow faster subsequent computing steps) and the pixel intensity noise (to increase the robustness to intensity noise). However, the embodiment is not limited to an averaging operation. Rather than averaging the pixel intensities of a module to characterize said module, other operations may be carried out such as for example: (i) computing the minimum value and the maximum value of the pixel intensities of the module; or (ii) computing a histogram of the pixel intensities of the module. Step A therefore results in a downsampling of the QR code image. Specifically, a module of a QR code may be downsampled to a single pixel as schematically illustrated by FIG. 9.

Figure 10:
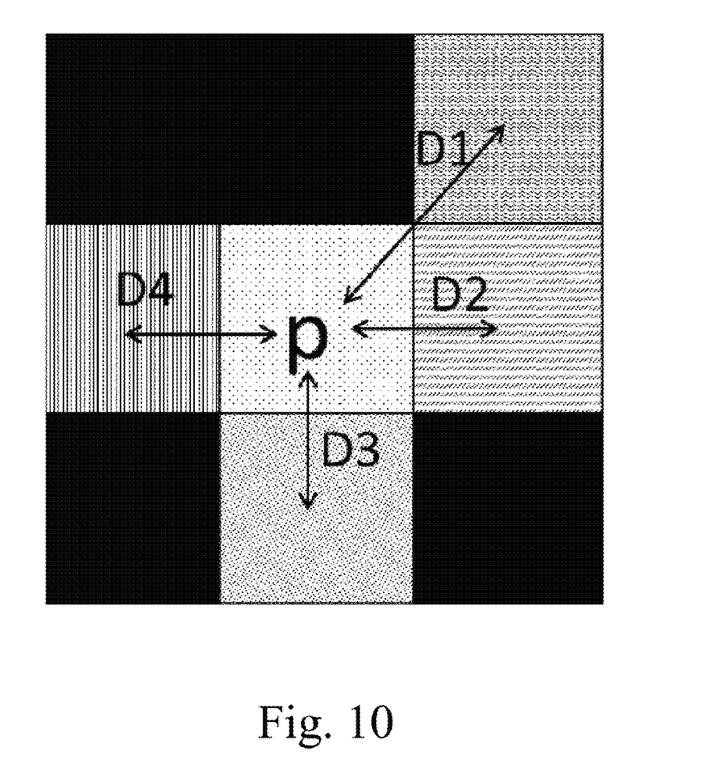
FIG. 10 schematically illustrates the computation of the differences between the transparent pixel p and its transparent neighbours (the example shows an 8-neighbour configuration), in one embodiment of the invention.

Step B: For each transparent pixel p of the downsampled image (wherein pixel p corresponds to a transparent module in the input image), the intensity difference Di between pixel p and its transparent neighbours (i.e., the neighbouring pixels corresponding to transparent modules of the QR code in the input image) is computed. Different types of neighbourhoods, such as an 8-neighbourhood as schematically illustrated by FIG. 10, may be used.

Step C: If Di is smaller than a threshold T, then Di is discarded from the measurement of the texture, and this may be indicated by a Boolean value in the byte associated the module in the signature. This thresholding is useful to remove the differences Di which are not discriminative in terms of texture comparison.

Step D: If Di is larger than the threshold T, and if Di is negative, the sign of Di is encoded as 0. Otherwise, the sign of Di is encoded as 1.

Step E: The sequence of the encoded signs resulting from the processing of all the transparent pixels of the downsampled image represents the texture of the pattern, and is part of the generated signature.

Step F: The measure of the texture, i.e. the generated signature, is then sent to a server together with the decoded unique identifier (i.e., the read code) of the QR code. This enables a fast one-to-one comparison for authentication. A Hamming distance may for example be used to compare two texture measures, i.e. the signature generated in step s300 and the reference signature generated in step s1300.

This embodiment is advantageous from a transmission and storage overhead perspective, when it comes to the signature. For example, for a 25×25 QR code printed on a pre-existing guilloche layer, the signature may comprise an array of 25×25 bytes, i.e. 625 bytes for both the black and light modules. If the actual image was transmitted, with each module represented by 6×6 pixels, there would be 36 times more data.

In another embodiment, which may be even more advantageous from a transmission and storage overhead perspective, the encoded signs of the computed Di values associated with each of the modules are transmitted to the server, in step F, on the fly, i.e. as soon as computed. In this embodiment, smaller amounts of data are transmitted to the server, and it is also unnecessary to store the entire signature on the imaging device. Furthermore, the server may decide whether the object is authentic before receiving the entire signature as soon as it determines that the number of comparison errors is larger than a threshold.

Both the embodiment described with reference to steps A to F, and the embodiment involving the on-the-fly transmission of bytes associated with each of the modules are also advantageous in that, in order to generate the signature, these embodiments focus on the local variability of the property of pre-existing layer 40 as detected by the imaging device through the imaged machine-readable representation of the code. Thus, the signature remains mostly unaffected by the illuminations conditions during the imaging process and by artefacts from the imaging process such as for example transitions in the imaged marking (e.g., shadows introduced in the imaging process). This leads to particularly reliable signatures.

The method discussed with reference to FIGS. 9 and 10 to measure the image texture (i.e., to measure the property of pre-existing layer 40, as detected by the imaging device) may be also applied, in one embodiment, to the dark modules of the QR code to capture the local variations of the darkness of the modules. This measure may be suitable to detect a copy attack (i.e. copying a Data Matrix Symbol from a genuine product item with a high-resolution scanner and printing it on several counterfeited product items). Furthermore, using the texture measures (i.e., the property of pre-existing layer 40) resulting from both the dark and the transparent modules of a QR code (or the like) improves the performance of the authentication method.

Figure 11A:
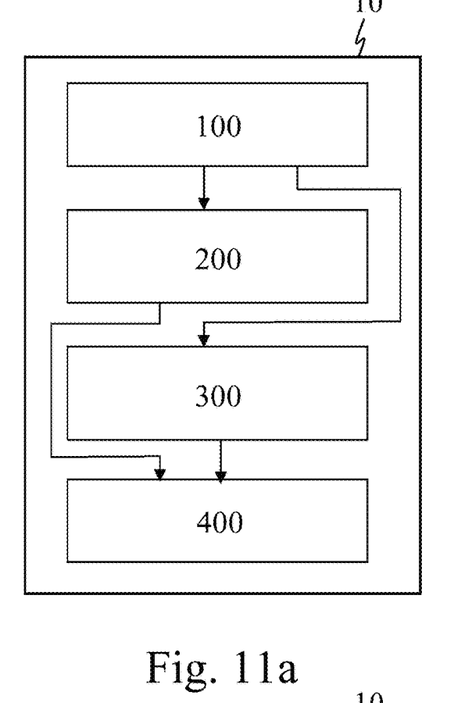
FIG. 11*a* schematically illustrates an imaging device in one embodiment of the invention, wherein the imaging device contributes in generating a measure of authenticity of an object.

FIG. 11a schematically illustrates an imaging device 10 in one embodiment of the invention, wherein imaging device 10 contributes in generating a measure of authenticity of an object 20. In one embodiment, imaging device 10 is configured for carrying out a method as described with reference to FIG. 3a, and comprises (i) a first unit 100, hereinafter referred to as "imaging unit" 100, configured for imaging marking 50; (ii) a second unit 200, hereinafter referred to as "code reading unit" 200, configured for reading the code represented by the imaged marking; (iii) a third unit 300, hereinafter referred to as "signature generating unit" 300, configured for generating a signature based on the property of preexisting layer 40 as detected by imaging device 10 through at least part of the imaged machine-readable representation of the code; and (iv) a fourth unit 400, hereinafter referred to as "sending unit" 400, configured for transmitting, to a processing device, the read code and generated signature for enabling the generation of a measure of authenticity of object 20.

Figure 11B:
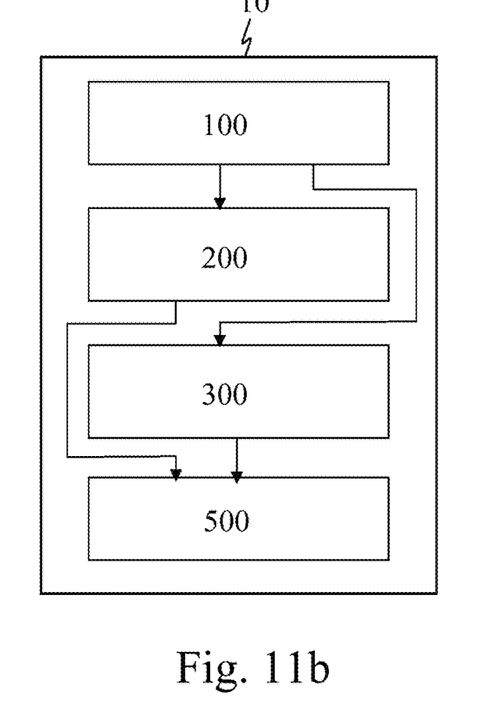
FIG. 11*b* schematically illustrates an imaging device in one embodiment of the invention, wherein the imaging device generates a measure of authenticity of an object.

FIG. 11b schematically illustrates an imaging device 10 in one embodiment of the invention, wherein imaging device 10 generates a measure of authenticity of an object 20. In one embodiment, imaging device 10 is configured for carrying out a method as described with reference to FIG. 3b. It comprises an imaging unit 100, a code reading unit 200, and a signature generating unit 300 as described with reference to FIG. 11a, as well as another unit, hereinafter referred to as "authenticity measure generating unit" 500, configured for generating a measure of authenticity of object 20 based at least on the read code and generated signature.

Figure 12:
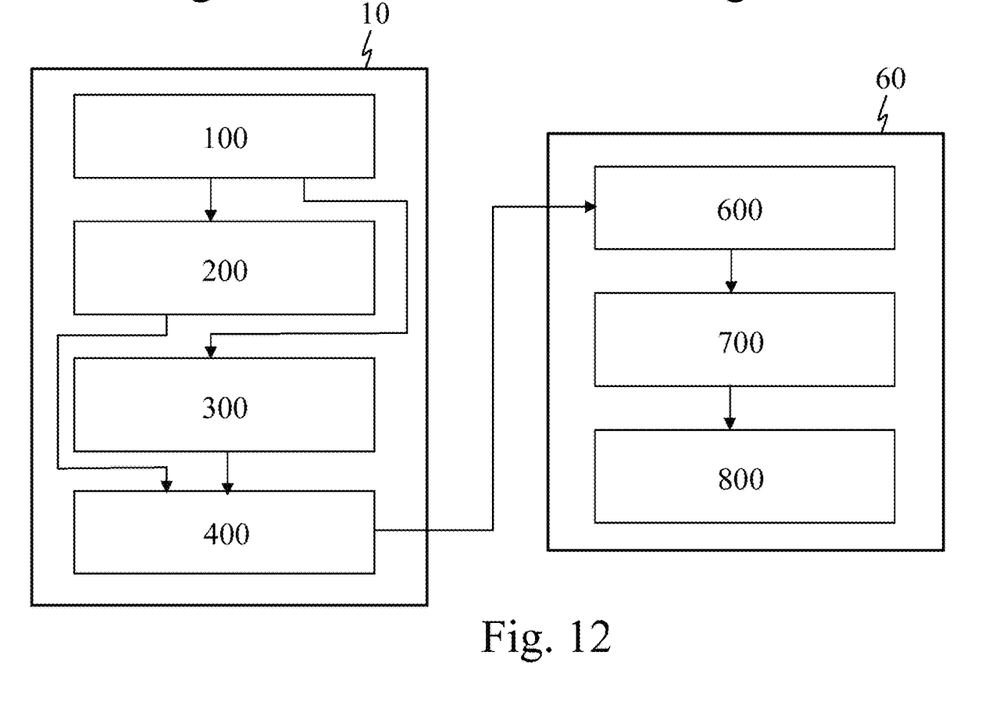
FIG. 12 schematically illustrates a system in one embodiment of the invention, wherein the system comprises both an imaging device and a processing device, and the system's operation results in generating a measure of authenticity of an object.

FIG. 12 schematically illustrates a system in one embodiment of the invention, wherein the system comprises both an imaging device 10 as described with reference to FIG. 11a and a processing device 60. The system operates to generate a measure of authenticity of an object 20. In one embodiment, said system is configured for carrying out a method as described with reference to FIG. 5. Processing unit 60 comprises (i) a unit 600, hereinafter referred to as "signature retrieving unit" 600, configured for retrieving in a data storage unit a signature stored in association with the read code (received from imaging device 10); (ii) another unit 700, hereinafter referred to as "comparing unit" 700, configured for comparing the generated signature (received from imaging device 10) with the stored signature (retrieved by signature retrieving unit 600); and (iii) yet another unit 800, hereinafter referred to as "external authenticity measure generating unit" 800, configured for generating a measure of authenticity of object 20 based at least on the result of the comparison between the generated signature and the stored signature.

Figure 13:
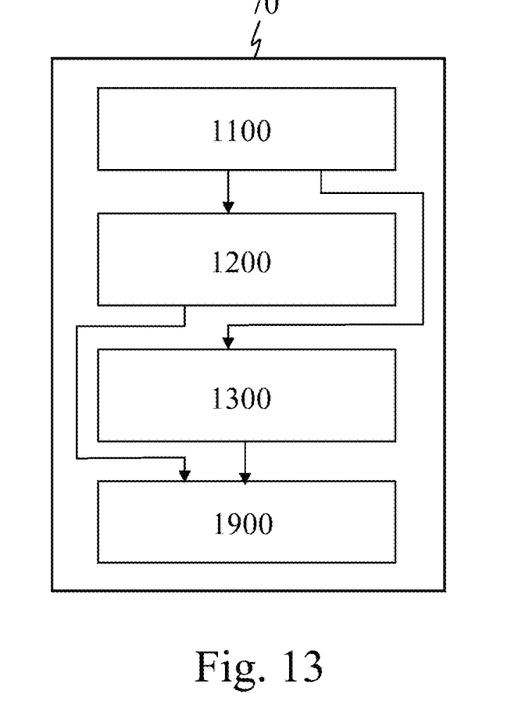
FIG. 13 schematically illustrates a system in one embodiment of the invention, wherein the system creates reference data to enable the later generation of a measure of authenticity of an object.

FIG. 13 schematically illustrates a system 70 in one embodiment of the invention, wherein system 70 creates reference data to enable later generation of a measure of authenticity of an object 20. In one embodiment, system 70 is configured for carrying out a method as described with reference to FIG. 6, and comprises (i) a unit 110, hereinafter referred to as "second imaging unit" 1100 (which may be different from imaging unit 100) configured for imaging marking 50; (ii) another (optional) unit 1200, hereinafter referred to as "second reading unit" 1200, configured for reading the code represented by imaged marking 50 (alternatively, the code may be known from the printing operation, as explained above); (iii) yet another unit 1300, hereinafter referred to as "second signature generating unit" 1300, configured for generating a signature based on the property of preexisting layer 40 as detected by imaging unit 1100 through at least part of the imaged machine-readable representation of the code; and (iv) another unit 1900, hereinafter referred to as "storing unit" 1900, configured for storing the code in association with the generated signature as reference data in a data storage unit.

Figure 14:
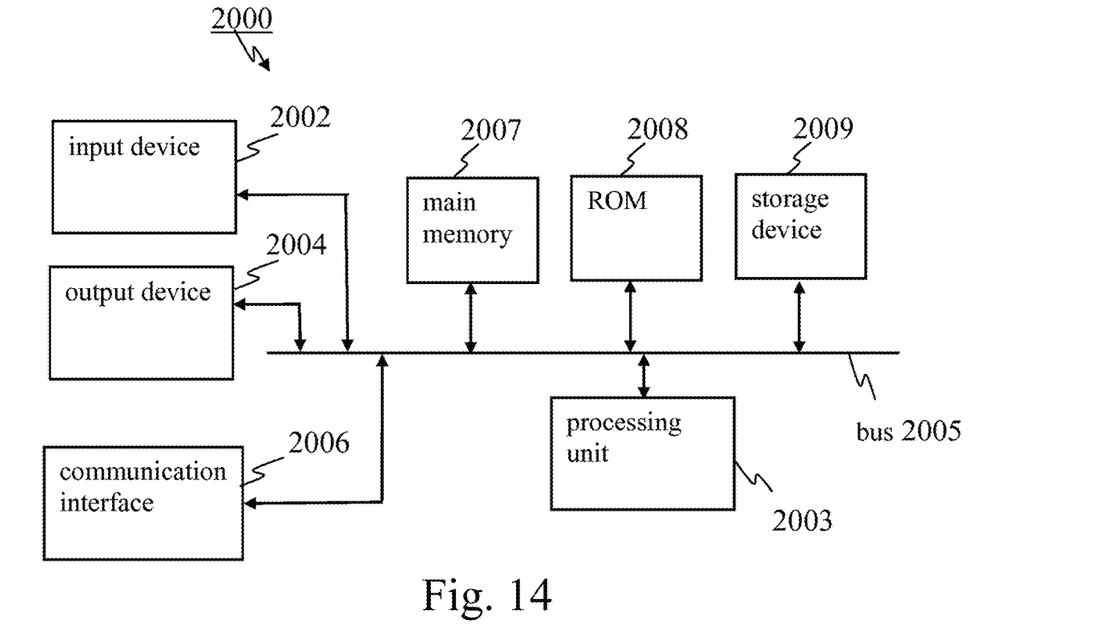
FIG. 14 is a schematic diagram of an exemplary implementation of a computing unit according to one embodiment of the invention.

FIG. 14 is a schematic diagram of an exemplary implementation of a computing unit 2000 that may be used in embodiments of the invention, such as, but not only, for generating the above-discussed signature and/or generating the above-discussed measure of authenticity.

As illustrated by FIG. 14, computing unit 2000 may include a bus 2005, a processing unit 2003, a main memory 2007, a ROM 2008, a storage device 2009, an input device 2002, an output device 2004, and a communication interface 2006. Bus 2005 may include a path that permits communication among the components of computing unit 2000.

Processing unit 2003 may include a processor, a microprocessor, or processing logic that may interpret and execute instructions. Main memory 2007 may include a RAM or another type of dynamic storage device that may store information and instructions for execution by processing unit 2003. ROM 2008 may include a ROM device or another type of static storage device that may store static information and instructions for use by processing unit 2003. Storage device 2009 may include a magnetic and/or optical recording medium and its corresponding drive.

Input device 2002 may include a mechanism that permits an operator to input information to processing unit 2003, such as a keypad, a keyboard, a mouse, a pen, voice recognition and/or biometric mechanisms, etc. Output device 2004 may include a mechanism that outputs information to the operator, including a display, a printer, a speaker, etc. Communication interface 2006 may include any transceiver-like mechanism that enables computing unit 2000 to communicate with other devices and/or systems (such as with a base station, a WLAN access point, etc.). For example, communication interface 2006 may include mechanisms for communicating with another device or system via a network.

Computing unit 2000 may perform certain operations or processes described herein. These operations may be performed in response to processing unit 2003 executing software instructions contained in a computer-readable medium, such as main memory 2007, ROM 2008, and/or storage device 2009. A computer-readable medium may be defined as a physical or a logical memory device. For example, a logical memory device may include memory space within a single physical memory device or distributed across multiple physical memory devices. Each of main memory 2007, ROM 2008 and storage device 2009 may include computer-readable media. The magnetic and/or optical recording media (e.g., readable CDs or DVDs) of storage device 2009 may also include computer-readable media. The software instructions may be read into main memory 2007 from another computer-readable medium, such as storage device 2009, or from another device via communication interface 2006.

The software instructions contained in main memory 2009 may cause processing unit 2003 to perform operations or processes described herein, such as for example generating a signature and/or generating the measure of authenticity. Alternatively, hardwired circuitry may be used in place of or in combination with software instructions to implement processes and/or operations described herein. Thus, implementations described herein are not limited to any specific combination of hardware and software.

The invention further relates to the following embodiments numbered (i) to (v):

Embodiment (i)

Method of claim 1, wherein the imaging device (10) is a hand-held device.

Embodiment (ii)

Method of embodiment (i), wherein the imaging device (10) is a mobile phone.

Embodiment (iii)

Imaging device (10) according to any one of claims 6 to 8, wherein the machine-readable representation of the code comprises at least one of a linear barcode and a two-dimensional barcode.

Embodiment (iv)

Imaging device (10) of embodiment (iii), wherein
the machine-readable representation of the code comprises a two-dimensional barcode and
the signature is configured to be generated based on the imaged marking within the boundaries of the two-dimensional barcode.

Embodiment (v)

Imaging device (10) according to any one of claims 6 to 8 and embodiments (iii) and (iv), wherein generating the signature comprises estimating spatial changes in the property of the preexisting layer (40) as detected by the imaging device (10) through at least part of the imaged machine-readable representation of the code.

Where the terms "data storage unit", "imaging unit", "code reading unit", "signature generating unit", "sending unit", etc. are used herewith, no restriction is made regarding how distributed these elements may be and regarding how gathered elements may be. That is, the constituent elements of a unit may be distributed in different software or hardware components or devices for bringing about the intended function. A plurality of distinct elements may also be gathered for providing the intended functionalities.

Any one of the above-referred units or devices, such as for example imaging device 10 and processing device 60, may be implemented in hardware, software, field-programmable gate array (FPGA), application-specific integrated circuit (ASICs), firmware or the like.

In further embodiments of the invention, any one of the above-mentioned data storage unit, imaging unit, code reading unit, signature generating unit, sending unit, etc. is replaced by data storage means, imaging means, code reading means, signature generating means, sending means, etc. or data storage module, imaging module, code reading module, signature generating module, sending module, etc.

respectively, for performing the functions of the data storage unit, imaging unit, code reading unit, signature generating unit, sending unit, etc.

In further embodiments of the invention, any one of the above-described methods, steps or processes may be implemented using computer-executable instructions, for example in the form of computer-executable procedures, methods or the like, in any kind of computer languages, and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. A method, carried out by an imaging device, for generating a measure of authenticity of an object or for contributing in generating a measure of authenticity of the object, wherein
the object comprises a surface at least partially comprising, or covered by, a base layer;
the base layer has at least one of a reflectance, reflectance spectrum, reflection, and emission property that is non-uniform;
a marking has been printed on a region of the surface in such a manner that one of the afore-mentioned non-uniform properties of the base layer is detectable by the imaging device through at least part of the marking; and
the marking comprises a machine-readable representation of a code;
the method comprising:
imaging the marking;
reading the code represented by the imaged marking;
generating a signature based on one of the afore-mentioned non-uniform properties of the base layer as detected by the imaging device through at least part of the imaged machine-readable representation of the code, wherein generating the signature comprises estimating spatial changes in the non-uniform property of the base layer as detected by the imaging device through at least part of the imaged machine-readable representation of the code;
transmitting, to a processing device, the read code and the generated signature for enabling the generation of a measure of authenticity of the object; and
generating a measure of authenticity of the object based on the read code and the generated signature.

2. The method of claim 1, wherein the machine-readable representation of the code comprises at least one of a linear barcode and a two-dimensional barcode.

3. The method of claim 2, wherein
the machine-readable representation of the code comprises a two-dimensional barcode and
the signature is generated based on the imaged marking within the boundaries of the two-dimensional barcode.

4. The method according to claim 1, wherein
the method comprises transmitting, by the imaging device to the processing device, the read code and the generated signature; and
the method is further carried out by the processing device and further comprises:
retrieving in a data storage unit, by the processing device, a signature stored in association with the read code;
comparing, by the processing device, the generated signature with the stored signature; and
generating a measure of authenticity of the object based at least on the result of the comparison between the generated signature and the stored signature.

5. An imaging device, for generating a measure of authenticity of an object or for contributing in generating a measure of authenticity of the object, wherein
the object comprises a surface at least partially comprising, or covered by, a base layer;
the base layer has at least one of a reflectance, reflectance spectrum, reflection, and emission property that is non-uniform;
a marking has been printed on a region of the surface in such a manner that one of the afore-mentioned non-uniform properties of the base layer is detectable by the imaging device through at least part of the marking; and
the marking comprises a machine-readable representation of a code;
the imaging device being configured for:
imaging the marking;
reading the code represented by the imaged marking;
generating a signature based on one of the afore-mentioned non-uniform properties of the base layer as detected by the imaging device through at least part of the imaged machine-readable representation of the code, wherein generating the signature comprises estimating spatial changes in the non-uniform property of the base layer as detected by the imaging device through at least part of the imaged machine-readable representation of the code;
transmitting, to a processing device, the read code and the generated signature for enabling the generation of a measure of authenticity of the object; and
generating a measure of authenticity of the object based on the read code and the generated signature.

6. The imaging device of claim 5, wherein the imaging device is a handheld device.

7. The imaging device of claim 6, wherein the imaging device is a mobile phone.

8. A system comprising an imaging device according to claim 6 and a processing device, wherein
the imaging device is configured for transmitting, to the processing device, the read code and the generated signature; and
the processing device is configured for:
retrieving in a data storage unit a signature stored in association with the read code;
comparing the generated signature with the stored signature; and
generating a measure of authenticity of the object based on the result of the comparison between the generated signature and the stored signature.

* * * * *